R. L. NORCROSS.
CRANKING DEVICE FOR GAS MOTORS.
APPLICATION FILED SEPT. 3, 1910.
991,880.
Patented May 9, 1911.
2 SHEETS—SHEET 2.
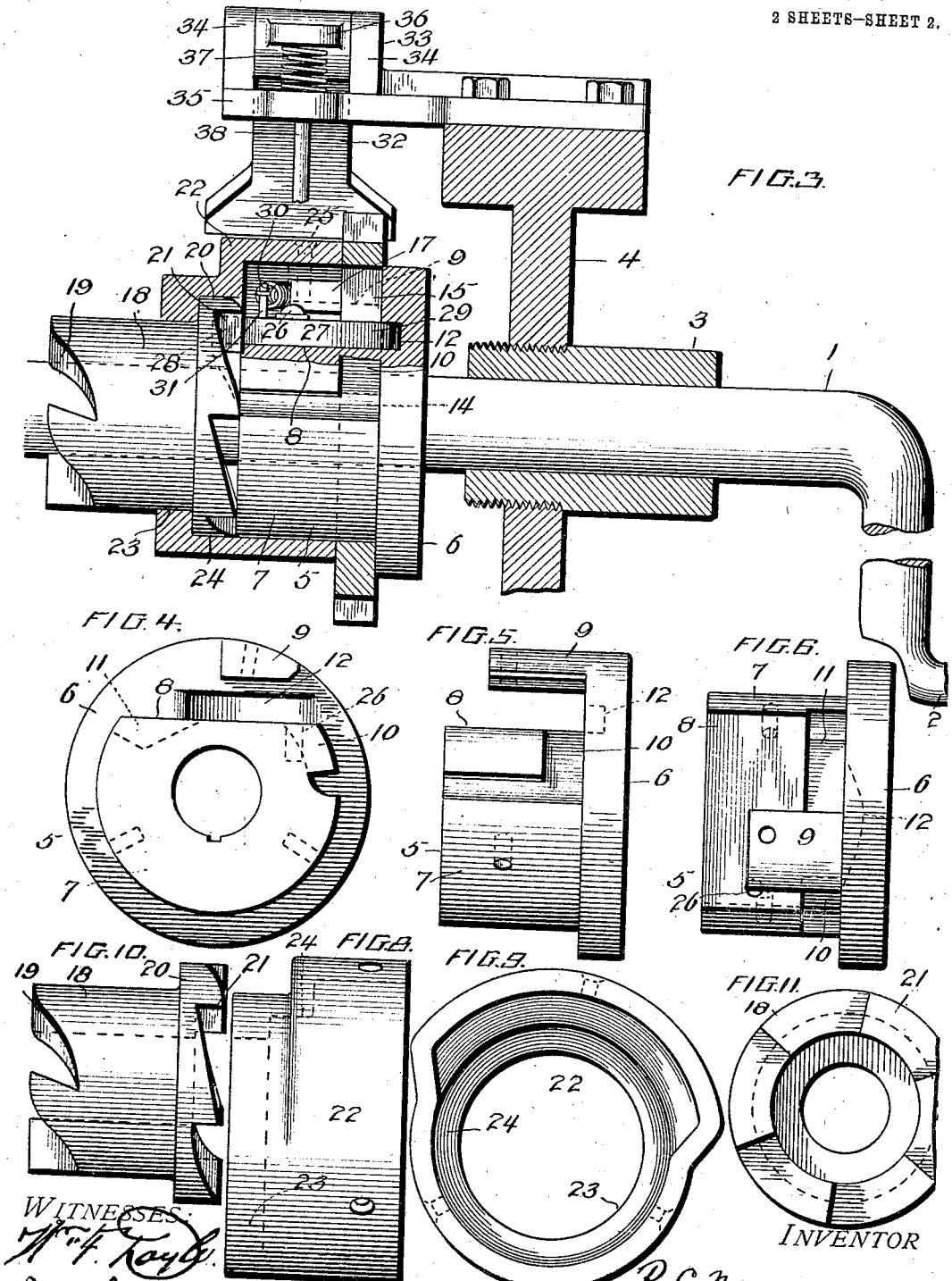

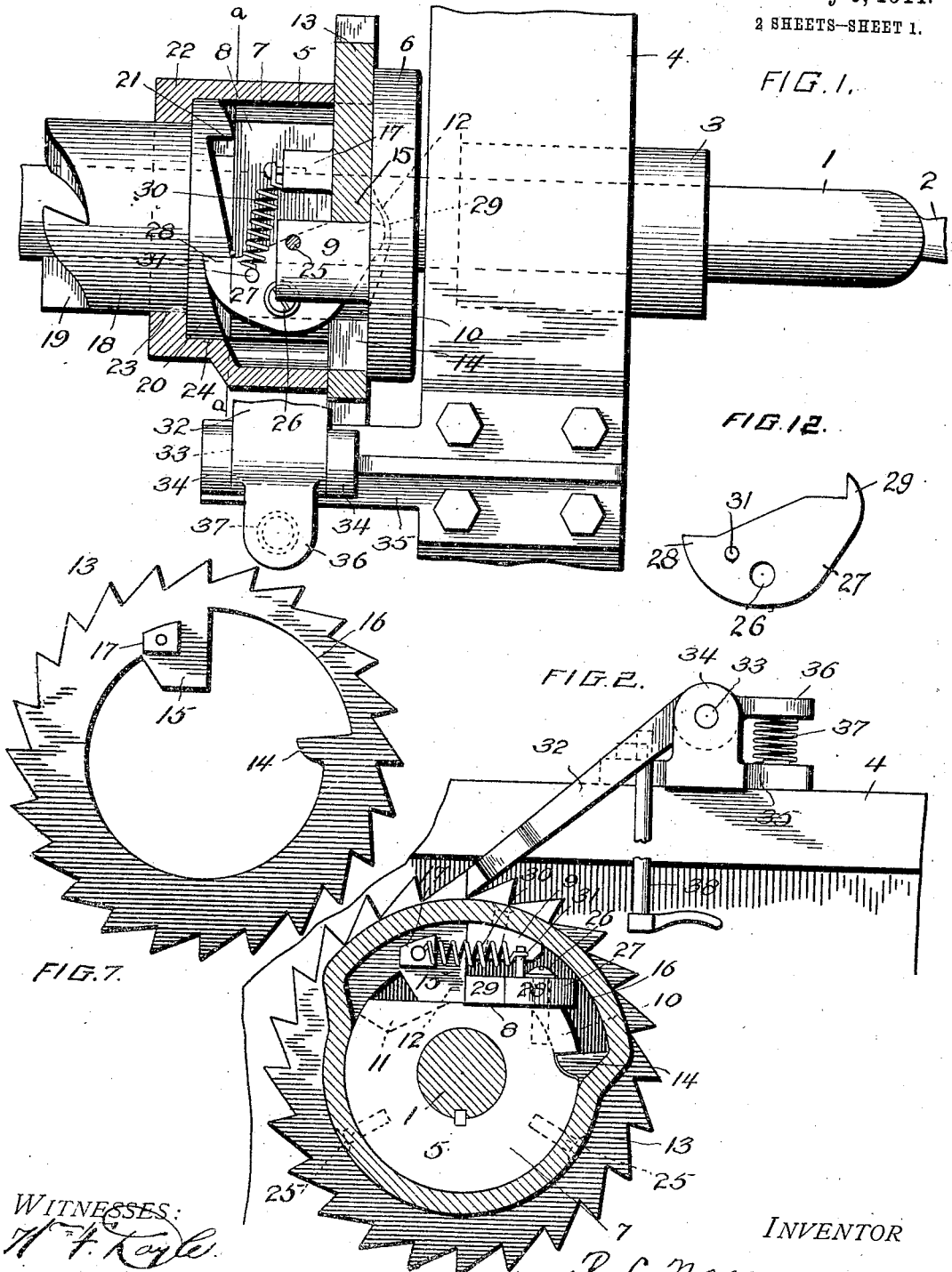

UNITED STATES PATENT OFFICE.

ROY L. NORCROSS, OF MINNEAPOLIS, MINNESOTA.

CRANKING DEVICE FOR GAS-MOTORS.

991,880.

Specification of Letters Patent. Patented May 9, 1911.

Application filed September 3, 1910. Serial No. 580,385.

*To all whom it may concern:*

Be it known that I, ROY L. NORCROSS, a citizen of the United States, residing at Minneapolis, in the county of Hennepin and State of Minnesota, have invented certain new and useful Improvements in Cranking Devices for Gas-Motors; and I do hereby declare the following to be a full, clear, and exact description of the invention, such as will enable others skilled in the art to which it appertains to make and use the same.

My invention relates to cranking devices for giving an initial rotation to the engine shaft of an explosion engine and is particularly intended for use in connection with automobiles.

The object of the invention is to provide a cranking device by which the person cranking the engine will be protected against injury from back firing in the engine cylinder.

It is well known that in cranking the engine of an automobile with the cranking devices commonly used, it sometimes happens that the engine back fires, that is an explosion takes place in the engine cylinder when the engine crank is on the wrong side, causing the shaft to be rotated in a direction opposite to its usual direction of rotation and the hand crank is thrown violently around in a direction opposite to that which is given to it by the person cranking, with great danger to him of serious injury.

By the device of my present invention, while back firing is not prevented, the possibility of backward rotation of the hand crank is prevented.

The invention consists in the construction and combination hereinafter described and claimed.

Referring to the drawings—Figure 1 is a plan view partly broken away, of a cranking device embodying my invention. Fig. 2 is a vertical cross sectional view on line a—a of Fig. 1. Fig. 3 is a side view partly in section of the device shown in Fig. 1. Fig. 4 is an end view of the collar which is fast on the crank shaft. Fig. 5 is a side view of the collar shown in Fig. 4. Fig. 6 is a top view of the collar shown in Fig. 4. Fig. 7 is a detail view of the ratchet wheel. Fig. 8 is a side view of the casing which incloses the fixed collar and the mechanism carried by it. Fig. 9 is an end view of the inclosing casing shown in Fig. 8. Fig. 10 is a side view of the loose collar. Fig. 11 is an end view of the loose collar shown in Fig. 10, and Fig. 12 is a detail view of the dog.

In the drawings—1 represents the crank shaft of the starting device for an automobile or other explosion engine, the handle of the crank being indicated at 2.

3 is a bearing for the shaft, carried by a cross bar 4 of the automobile frame. The bearing 3 is arranged to permit the crank shaft to slide through it to enable it to be engaged and disengaged from the engine shaft. Fast on the crank shaft toward the end opposite the crank handle and on the opposite side of the bearing 3 from the crank handle is a collar 5 having a flange 6 and a hub 7, which is flattened as shown at 8. Above the flattened portion 8, the flange 6 is provided with a lug 9. The hub is also provided with recesses 10 and 11 each formed in the periphery of the hub adjacent the flange 6 and extending in opposite directions from the flattened portion 8. In the face of the flange 6 adjacent the flattened portion 8 is formed a recess 12.

Mounted on the hub 7 is a ratchet wheel 13, provided on its interior with lugs 14 and 15, extending inward and adapted, when the ratchet wheel is in position, to engage the recesses 10 and 11 respectively. Between the lugs 14 and 15 the ratchet wheel is cut away as shown, to form an opening or recess 16, through which lug 9 on the flange 6 extends. The ratchet wheel is provided at 17 with a laterally extending lug which extends out over the flattened portion 8 of the hub.

Loose on the crank shaft, near its end is a collar 18 having at its outer end ratchet teeth 19 for engagement with similar ratchet teeth on the end of the engine shaft, (not shown) and having its inner end against the end of the hub 7 of the collar 5. The inner end of this collar 18 is enlarged as shown at 20 and this enlarged portion is provided on its end with ratchet teeth 21. The collar 18 is held against the end of collar 5 by a casing 22 having a central opening 23 through which the collar 18 extends and an annular recess 24, in which the enlarged portion 20 of the collar is received. The exterior walls of the annular recess 24 extend over the hub 7 and the casing is secured to the hub by screws 25.

On the flattened portion 8 of the hub 7 is pivoted at 26, a dog 27 having a tooth 28, adapted to extend beyond the end of the hub 7 into position to engage the teeth 21 on the end of the enlarged portion 20 of the collar 18. The other end of the dog 27 is adapted to extend through the opening 16 of the ratchet wheel 13, and into the recess 12 in the face of the flange 6, and is provided on its end with a finger 29 adapted to engage the lug 15 of the ratchet wheel. A coiled spring 30 is connected at one end to the lug 17 carried by the ratchet wheel and at the other end is connected to a pin 31 on the dog 27 between the pivot 26 and the tooth 28, so that the spring tends to hold the tooth against the radial face of a tooth 21, with the end 29 against lug 15 of the ratchet wheel 13.

32 is a pawl arranged to engage the teeth of the ratchet wheel 13. This pawl is pivoted at 33 between lugs 34 on a bar 35, which is bolted to the cross bar 4. The pawl has a tail piece 36 between which and the bar 35 is placed a spring 37, which acts to keep the end of the pawl in engagement with the teeth of the ratchet wheel 13. This end of the pawl is made sufficiently broad to engage the teeth of the ratchet wheel throughout the shifting movement necessary to engage and disengage the teeth 19 with the teeth on the end of the engine shaft. An arm 38 is connected to the pawl for lifting its end out of engagement with the ratchet wheel.

When the parts are in position and the crank shaft is shifted to engage the engine shaft, the tooth 28 of the dog 27 will engage a tooth 21 of the collar 18 and cause it to rotate with the crank shaft, the tooth 28 being held in this position by the engagement of its end 29 with the lug 15 of the ratchet wheel 13, the ratchet wheel being turned in a direction to permit its teeth to slip past the end of the pawl 32. In case there should be back firing and the engine rotates in a backward direction, the pawl will engage the ratchet wheel and hold it, causing the lug 15 to move away from the end 29 of the dog 27, leaving the dog free to yield against the force of the spring 30 and thus allowing the collar 18 to be rotated by the engine without rotating the crank shaft 1, the latter, after the slight movement permitted by the lug 14 and the end of recess 10, which is necessary to release the end of the dog 27, being locked against backward movement by the pawl. The operator is thus absolutely protected against possibility of being injured by the back motion.

In order to restore the parts to initial position, the collar 18 being first disengaged from the engine shaft, the crank shaft should be rotated in a backward direction until its movement is stopped by contact of the lug 14 with the end of recess 10, the ratchet wheel being held from rotation by the pawl 32. This will carry the lug 15 out of the way of the finger 29 on the end of dog 27 and the spring 30 will at once restore the dog 27 to initial position and a slight forward movement of the crank shaft will cause the lug 15 of the ratchet wheel to engage the finger 29, locking the dog 27 in initial position.

It will of course be understood that I do not desire to be limited to the precise form of construction shown, as it is obvious that many changes may be made in form construction and arrangement without departing from the spirit of the invention.

Having thus described my invention, what I claim is—

1. In a cranking device for explosive engines, the combination with the crank shaft, of a collar provided with means for engaging the engine shaft and loose on the crank shaft, said collar having an enlarged portion, a collar fixed on the crank shaft, means carried by the fixed collar adapted to engage the loose collar, means for releasing the engaging means arranged to be operated by the backward rotation of the engine shaft, and a casing secured to the fixed collar and inclosing the enlarged portion of the loose collar to prevent longitudinal movement thereof.

2. In a cranking device for explosion engines, the combination with the crank shaft of a collar provided with means for engaging the engine shaft, a collar fixed to the crank shaft and flattened on one side, a dog pivoted on the flattened side of the fixed collar having one end arranged to engage the loose collar and means carried by the fixed collar for locking the dog in position to engage the loose collar and for releasing it from engagement upon the backward rotation of the engine shaft.

3. In a cranking device for explosion engines, the combination with the crank shaft, of a collar provided with means for engaging the engine shaft, a collar fixed to the crank shaft and flattened on one side, a dog pivoted on the flattened side of the fixed collar, a ratchet wheel carried by the fixed collar and rotatable thereon and provided with means for engaging the dog to hold it in locked engagement with the loose collar and a pawl engaging the ratchet wheel to prevent its backward rotation, whereby on the backward rotation of the loose collar the dog will be carried backward out of engagement with the ratchet wheel and thereby unlocked from engagement with the loose collar.

4. In a cranking device for explosion engines, the combination with the crank shaft, of a collar provided with means for engaging the engine shaft and loose on the crank shaft, a collar fixed on the crank shaft and flattened on one side, a dog pivoted on the flattened side of the collar having at one end a tooth and having a finger at the other end, a ratchet wheel journaled on the collar and provided with a lug for engaging the finger on the dog to lock the dog in engagement with the loose collar, means for limiting the rotation of the ratchet wheel on the fixed collar and a pawl engaging the ratchet wheel to prevent its rotation in a backward direction.

5. In a cranking device for explosive engines, the combination with the crank shaft, of a collar provided with means for engaging the engine shaft and loose on the crank shaft, said collar having an enlarged inner portion and teeth on the end thereof, a collar fixed on the crank shaft, a dog pivoted on the fixed collar adapted to engage the teeth of the loose collar, means carried by the fixed collar for disengaging the dog from the teeth of the loose collar by the backward rotation of the engine shaft, and a casing secured to the fixed collar and inclosing the enlarged portion of the loose collar to prevent longitudinal movement thereof.

6. In a cranking device for explosive engines, the combination with the crank shaft, of a collar provided with means for engaging the engine shaft and loose on the crank shaft, said collar having an enlarged inner portion and teeth on the end thereof, a collar fixed on the crank shaft and having a flattened side, a dog pivoted on the flattened side of the fixed collar, a ratchet wheel rotatably mounted on the fixed collar and having a lug adapted to engage said dog for holding it in locked engagement with the teeth of the loose collar, a pawl engaging the ratchet wheel to prevent backward rotation thereof, whereby on the backward rotation of the engine shaft the dog will be disengaged from the teeth of the loose collar, a spring connected to the fixed collar and the dog for bringing the dog in engagement with the teeth of the loose collar upon rotation of the crank, and a casing secured to the fixed collar to prevent longitudinal movement thereof.

In testimony whereof I affix my signature in presence of two witnesses.

ROY L. NORCROSS.

Witnesses:
J. B. TABOUR,
E. M. BARNUM.

---

Copies of this patent may be obtained for five cents each, by addressing the " Commissioner of Patents, Washington, D. C."